United States Patent Office 3,351,757
Patented Nov. 7, 1967

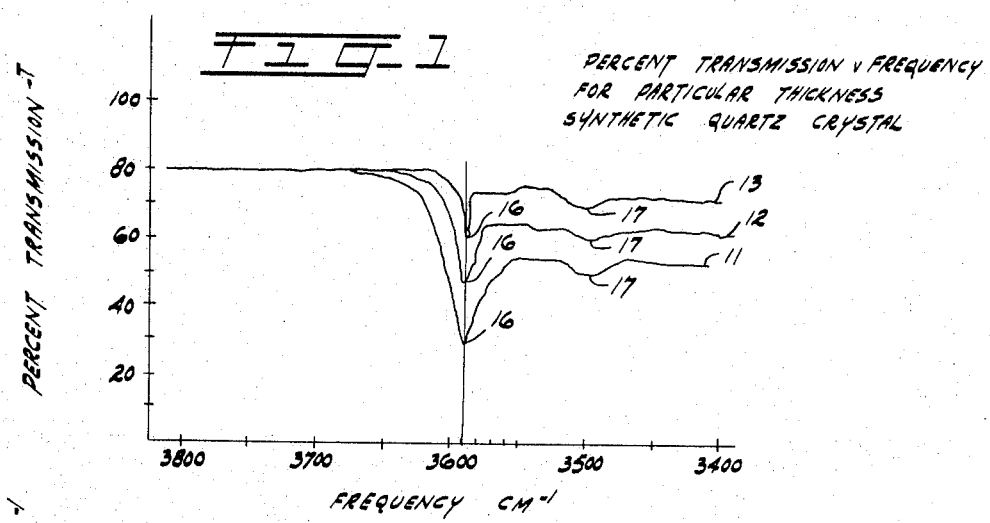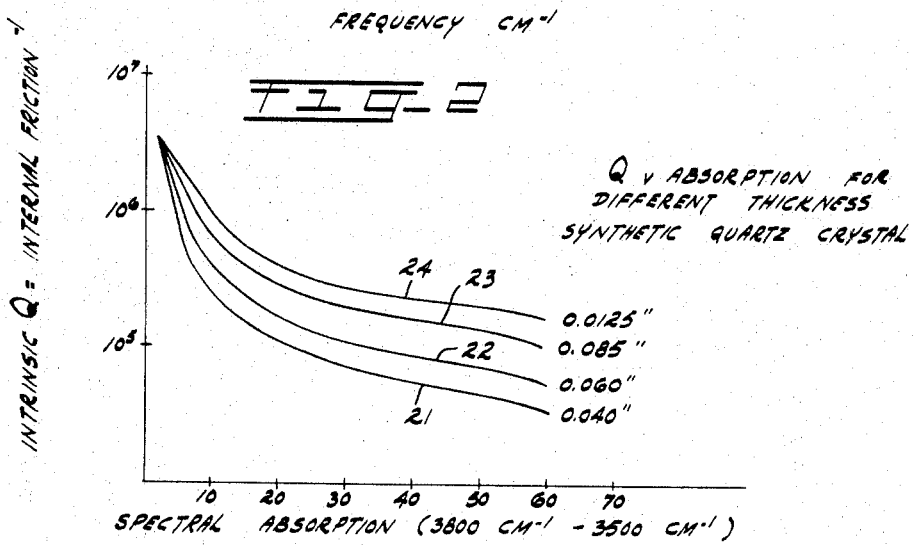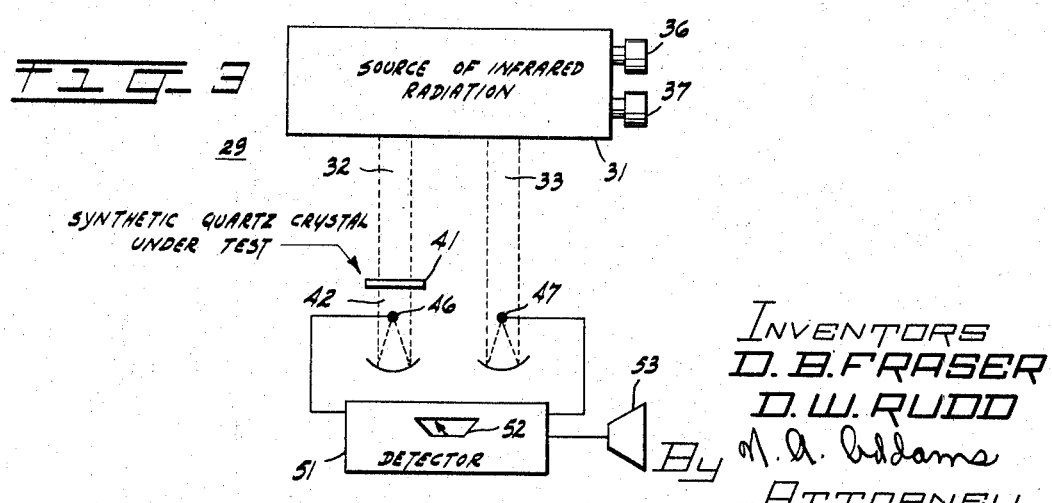

3,351,757
METHOD OF TESTING THE INTERNAL FRICTION OF SYNTHETIC QUARTZ CRYSTAL BY THE USE OF TWO DIFFERENT FREQUENCIES OF INFRARED
David B. Fraser, Berkeley Heights, N.J., and David W. Rudd, Topsfield, Mass.; said Fraser assignor to Bell Telephone Laboratories, Incorporated, and said Rudd assignor to Western Electric Company, Incorporated, New York, N.Y., both corporations of New York
Filed Feb. 18, 1965, Ser. No. 433,676
3 Claims. (Cl. 250—83.3)

ABSTRACT OF THE DISCLOSURE

Methods for determining the internal friction of a sample of quartz crystal wherein a calibration curve is plotted which correlates the internal friction for quartz crystal as a function of spectral absorption of infrared energy transmitted by such material; means for irradiating quartz crystal with infrared energy is adjusted to establish a reference value of infrared energy transmitted by quartz crystal at a first frequency; the sample crystal is irradiated with infrared energy at a second frequency, at which frequency quartz crystal shows an absorption peak with respect to the energy transmitted therethrough; the value of energy transmitted by the quartz crystal sample at said second frequency provides a value of spectral absorption when compared to the previously established reference value; and the value of spectral absorption so determined is converted into a corresponding value of internal friction for the sample quartz crystal upon reference to the plotted curve. The foregoing provides a "GO–NO GO" test method upon ascribing a value of internal friction to the sample crystal when the measured value of infrared energy transmitted by the sample at a peak absorption frequency is at least a given percentage of the reference value of energy previously established.

---

This invention relates to a method of testing synthetic quartz crystals. More particularly, the invention relates to such a method wherein the absorption of infrared radiation by a synthetic quartz crystal is correlated to its internal friction to predict its acceptability for a particular end use.

It is desirable to test a synthetic quartz crystal, prior to its fabrication for end use in an electrical circuit, to ascertain whether its internal friction satisfies prescribed specifications for such end use. Prior to this invention, it was necessary to fabricate a raw synthetic crystal into a finished crystal unit, and then test the finished crystal unit for internal friction in its operative circuit.

The fabrication of a raw synthetic quartz crystal into a finished crystal unit is a complex process. In this process, a raw synthetic quartz crystal is cut at the proper angle into a crystal wafer. The crystal wafer is cut into a plurality of crystal blanks each blank having the approximate dimensions of a finished crystal unit. The physical dimensions of a finished crystal unit is one of the factors which determines the resonant frequency of oscillation of the unit. The crystal blank is ground to the precise dimensions at which it is designed to oscillate. The precisely dimensioned crystal blank is plated with gold, and electrodes are attached to the gold plating to define a finished crystal unit. The finished crystal unit is then mounted in a circuit, such as an oscillator, and tested to ascertain whether its internal friction, given the symbol $Q^{-1}$, meets the prescribed specifications.

Although internal friction, $Q^{-1}$, is the parameter measured in determining the quality of a synthetic quartz crystal, it is conventional to speak in terms of "Q," the reciprocal of "$Q^{-1}$." Q, when measured in a circuit, is spoken of as "circuit Q" which is the reciprocal of internal friction of a finished crystal unit in its circuit mounting; whereas, "intrinsic Q" is the reciprocal of internal friction of a synthetic quartz crystal in its natural or unmounted condition. Intrinsic Q of a synthetic quartz crystal is considerably higher than its circuit Q due to losses caused, among other things, by its mounting in a circuit.

Manufacturing experience has demonstrated that when testing the circuit Q of certain types of finished crystal units, the yield of finished crystal units which meet the prescribed specifications is better for certain types of crystal units than for others. Thus, it is desired to devise a reliable test for Q for all types of finished crystal units which can be performed prior to the fabrication of synthetic quartz crystals into finished crystal units.

Prior to this invention, there was no known method of correlating Q to a measurable parameter of synthetic quartz crystals prior to fabrication into finished crystal units. In one way of practicing the invention, the correlation is made after the raw synthetic quartz crystal has been cut into a crystal wafer to ascertain whether the crystal wafer possesses a minimum acceptable intrinsic Q. However, the correlation can be made at any point in the fabrication of the raw synthetic quartz crystal into a finished crystal unit.

Experimentation has shown that when testing synthetic quartz crystals in accordance with the invention more than 97% of those crystal wafers accepted for fabrication into finished crystal units meet the minimum intrinsic Q necessary to achieve the specified circuit Q. Thus, a significant advantage of the invention is the ability to reliably ascertain, prior to fabrication of a raw synthetic quartz crystal into a finished crystal unit, whether the crystal will meet prescribed specifications in a circuit. A corollary advantage is the manufacturing savings realized by discarding synthetic quartz crystals which will not meet the prescribed specifications.

Accordingly an object of this invention is to provide a new and improved method of testing synthetic quartz crystals.

Another object is to provide a method of testing a synthetic quartz crystal to predict its acceptability for a particular end use before it is fabricated for such end use.

Another object is to provide a method of testing a synthetic quartz crystal wherein its absorption of infrared radiation is correlated to its internal friction to predict its acceptability for a particular end use.

Another object is to provide a method of testing a synthetic quartz crystal to ascertain whether its internal friction will satisfy prescribed specifications for a finished crystal unit prior to its fabrication into a finished crystal unit. A related object is to perform such a test based on the optical absorption of infrared radiation of the synthetic quart crystal.

With these and other objects in mind, the invention contemplates a method of testing the internal friction of a synthetic quart crystal, wherein an individual internal friction-spectral absorption calibration is constructed for crystals of various thicknesses. A synthetic quart crystal of a particular thickness is analyzed to ascertain the amount of infrared radiation absorption at two different frequencies in the infrared spectrum. The amount of infrared radiation absorption is correlated to the internal friction of the crystal by the internal friction-absorption calibration for that thickness crystal.

According to another way of practicing the invention, a certain type of synthetic quartz crystal, having a particular thickness and having an internal friction-absorption calibration for that thickness, is placed in the path of a beam of infrared radiation of a particular frequency to determine the amount of infrared radiation transmitted that frequency. From the internal friction-spectral absorption calibration for that particular thickness previously correlated to amounts of infrared radiation transmitted, the amount of infrared radiation transmitted determines the internal friction of the crystal. Thus, this second method of practicing the invention is a GO–NO GO test for a particular type of synthetic quartz crystal having a particular thickness.

Other objects and advantages of the invention will become apparent by referring to the following detailed specification and drawings, wherein:

FIG. 1 is a graph showing transmission curves of percent infrared radiation transmitted by a synthetic quartz crystal versus incident infrared radiation for three crystals;

FIG. 2 is a graph showing calibration curves of internal friction versus spectral absorption for a series of synthetic quartz crystals of different thicknesses; and FIG. 3 is a schematic diagram of an apparatus suitable for testing the specified intrinsic internal friction necessary for a synthetic quartz crystal prior to its fabrication into a finished crystal unit.

FIG. 1 illustrates some of the relationships used in the practice of the method of this invention. Transmission curves 11, 12, and 13 depict the variation of percent transmission, given the symbol T, of infrared radiation versus incident infrared radiation over a frequency range of 3800–3400 cm.$^{-1}$, for synthetic quartz crystal wafers of identical thickness. It is noted that there is a well-defined downward peak 16 for each transmission curve 11–13 at substantially 3590 cm.$^{-1}$ and a smoother downward dip 17 at substantially 3500 cm.$^{-1}$.

FIG. 2 illustrates a set of calibration curves 21–24, each curve being for a crystal wafer of a different thickness. Each calibration curve, for example calibration curve 21, is constructed as follows: the circuit mounting, electrodes, and gold plating, are stripped from a plurality of finished crystal units, each finished crystal unit being of identical thickness and each unit having the minimum acceptable circuit Q as required by prescribed specifications. The finished crystal units are then tested for their intrinsic Q.

In one known method of determining Q of a synthetic quartz crystal, a test signal is applied to oscillate crystal. The amplitude of the oscillations are displayed on an oscilloscope. Q is then proportional to "Q–1" which is proportional to the reciprocal of the number of cycles of oscillation required for the amplitude of the oscillations to decay to $1/e$ of some given amplitude.

The above-described method of determining Q has not been described in detail, since it is not necessary to a description of the invention. However, this method and other methods of determining Q are described in a report numbered 27424–0, entitled "Fundamental Studies of the Properties of Natural and Synthetic Quartz Crystals," dated June 10, 1960, pages 10–13, and written by the Bell Telephone Laboratories under U.S. Government Contract No. DA 36–039–SC–64586.

The intrinsic Q of the plurality of crystal units having been determined, the spectral absorption of each crystal unit at two particular frequencies of infrared radiation is measured using an apparatus to be described later and is plotted against intrinsic Q.

Each of the other calibration curves 22–24 are constructed in a like manner for finished crystal units of different thicknesses. It is noted that all of the calibration curves 21–24 are of similar configuration. Therefore, additional calibration curves for finished crystal units having thicknesses different from those of finished crystal units represented by calibration curves 21–24 can be constructed by interpolating between two existing calibration curves.

With reference to FIG. 3 there is schematically shown an apparatus 29 for making the measurements necessary to construct curves 11–13 and 21–24 of FIGS. 1 and 2, respectively. Basically, apparatus 29 comprises a double beam infrared spectrophotometer of the kind familiar to those skilled in the art, for example apparatus 29 may be a Perkin-Elmer, model 421 or model 237–B grating spectrophotometer. In the interest of simplicity and because the specific details of apparatus 29 are not critical, the apparatus has not been shown in detail, but in schematic form.

Apparatus 29 includes a source 31 of monochromatic infrared double beam radiation which may be polarized or unpolarized. Source 31 comprises a broad band infrared source, such as a Globar, which is used to provide a pair of infrared beams (not shown). Each of the pair of infrared beams is converted into a monochromatic infrared beam, 32 and 33, by means of a prism, such as a Littrow mirror, and an exist slit. The wavelength or frequency, which is the reciprocal of wavelength, of the infrared beams 32 and 33 is controllable by a control dial 36 which sets the angle of incidence of the broad band infrared source on the prisms. The angle of incidence fixes the frequency of the substantially monochromatic infrared radiation passing through the exit slits. Typically, there is also included a control dial (not shown) for fixing the bandwidth of the emergent beam of radiation. Also, there is generally included a control dial 37 for setting beams 32 and 33 to an equal intensity at some desired base line of percent transmission, for example 80% as shown in FIG. 1.

Beam 32 is directed along a path onto the synthetic quartz crystal 41 under test. Beam 42 of infrared radiation, which passes through synthetic crystal 41, is collected by a conventional radiation thermocouple 46 connected to provide a measure of the incident beam 42 of radiation upon it. Beam 33 is directed along a path onto a second radiation thermocouple 47, which is connected to provide a measure of the reference or sample beam 33 of radiation upon it.

The voltages developed by thermocouples 46 and 47 are then applied to a detector 51. Detector 51 is provided with a meter 52 to visually indicate the voltages developed by the individual thermocouples 46 and 47, which represent the percent transmission of infrared radiation passed by synthetic quartz crystal 41 and the percent transmission or intensity of beams 32 and 33, respectively. Also, apparatus 29 can be provided with a conventional pen recorder for automatically recording a graph, of the type depicted in FIG. 1, for an infrared spectral analysis of a synthetic quartz crystal.

Many different types of finished crystal units are manufactured, each being identified by a code number. For purposes of illustration, the practice of the invention will be described in connection with a finished crystal unit manufactured by the Western Electric Company, Inc. and designated by the code 37 EG crystal unit. The 37 EG crystal unit is 0.040 inch thick, and is fabricated from a crystal blank 0.040 inch thick which in turn is fabricated from a crystal wafer 0.060 inch thick. The 37 EG crystal unit is designed to oscillate at 104 kc., and is required by prescribed specifications to have a minimum acceptable circuit Q of 30,000 over a temperature range of 15.° C. to 55° C. When testing the intrinsic Q of 37 EG crystal units, it was found that an intrinsic Q of 190,000 or greater was necessary in order to realize a circuit Q of 30,000.

According to one way of practicing the invention, a raw synthetic quartz crystal is cut into a crystal wafer 41 having a thickness of 0.060 inch. If the test indicates that crystal wafer 41 has the minimum acceptable intrinsic Q, then crystal wafer 41 will be fabricated into a 37 EG crystal unit. Crystal wafer 41 is coated with a fluorocarbon oil, such as "Fluro-Lube," which is manufactured by the Hooker Chemical Company of Niagara, N.Y. The fluorocarbon oil increases the transmission of infrared radiation through crystal wafer 41 and does not absorb infrared radiation in the range of radiation used in the practice of the invention. It is to be understood that the fluorocarbon oil coating is not essential to the practice of the invention, it only being used to increase the transmission of infrared radiation through crystal wafer 41 to facilitate the operation of apparatus 29.

Crystal wafer 41 is placed in instrument 29 in the path of infrared beam 32. Control dial 36 is then manipulated to adjust beams 32 and 33 to emit infrared radiation having a frequency of 3800 cm.$^{-1}$. Control dial 37 is then manipulated to adjust beams 32 and 33 to an intensity of 80% transmission to establish a base line at 80% in FIG. 1. It is to be understood that the intensity of beams 32 and 33 could be adjusted to 100% or some other percent, 80% being convenient for the testing of the 37 EG crystal unit.

Control dial 36 is then manipulated to adjust beams 32 and 33 to emit infrared radiation having a frequency of 3500 cm.$^{-1}$, the percent transmission ($T_{3500}$) being noted on meter 52. The percent transmission ($T_{3500}$) is then subtracted from the percent transmission ($T_{3800}$) to give an indication of the absorption of infrared radiation by crystal wafer 41; for example $T_{3500}$ may read 65%; therefore, $T_{3800} - T_{3500} = 80\% - 65\%$, or 15.

The appropriate calibration curve of FIG. 2 is then consulted. Assuming that calibration curve 22 is for crystal wafers having a thickness of 0.060 inch, then the intrinsic Q which correlates to a spectral absorption of 15 is noted at approximately 200,000. This intrinsic Q is more than sufficient to meet the minimum acceptable 190,000 intrinsic Q required for a 37 EG crystal unit. Crystal wafer 41 is then accepted for fabrication into a 37 EG crystal unit.

The range of infrared radiation of $T_{3800} - T_{3500}$ cm.$^{-1}$, and the adjusting of beams 32 and 33 to an intensity of 80% transmission at $T_{3800}$ is merely illustrative of the principles involved in the practice of the method. It is to be understod that a different range of infrared radiation can be used and that instrument 29 can be adjusted to a different base line than 80%.

Synthetic quartz crystals of any thickness, can be tested to predict the acceptability of the crystals for fabrication into finished crystal units. It is only necessary to cut a raw synthetic quartz crystal into a crystal wafer, take the appropriate readings of infrared radiation transmitted on instrument 29, measure the exact thickness of the crystal wafer, and consult the appropriate calibration curve 21–24, or interpolated calibration curve, to correlate the infrared radiation absorbed to intrinsic Q.

According to a second way of practicing the invention, a plurality of synthetic quartz crystals of identical thickness undergo a GO–NO GO test to ascertain their suitability for fabrication into finished crystal units. A calibration curve (not shown but of the type shown in FIG. 2) had previously been constructed for crystals having a thickness of 0.060 inch for infrared radiation at frequencies of $T_{3800}$ cm.$^{-1}$ – $T_{3590}$ cm.$^{-1}$.

Using the 37 EG crystal unit as an example again, a raw synthetic quartz crystal is cut into a plurality of crystal wafers 41 having a thickness of 0.060 inch. The first of the plurality of crystal wafers 41 is inserted into instrument 29 in the path of beam 32. Control dials 36 and 37 are manipulated to adjust beams 32 and 33 to emit infrared radiation having a frequency of 3590 cm.$^{-1}$ at a base line of 80% intensity.

Referring to FIG. 1, as noted before each transmission curve 11–13 has a distinctive downward peak 16 at 3590 cm.$^{-1}$ and a downward dip at 3500 cm.$^{-1}$. Thus, having a calibration curve for a particular thickness crystal wafer 41 of $T_{3800} - T_{3590}$, the transmission curve can be correlated to the calibration curve. Accordingly, if peak 16 drops below 60% transmission (which is read on meter 52) as does peak 16 of transmission curves 11 and 12, then the crystal wafer 41 represented by curve 11 or 12 are rejected. Since peak 16 of transmission curve 13 is at 60% transmission, then the crystal wafer 41 represented by curve 13 is accepted for fabrication. The rest of the crystal wafers are thereafter individually inserted into apparatus 29 and the percent transmission ascertained. Meter 52 can be calibrated directly in terms of intrinsic Q for a particular thickness crystal to further facilitate the practice of the invention.

Facilities can be connected to meter 52 to provide an audible signal when the transmission curve drops below 60% transmission at a frequency of 3590 cm.$^{-1}$. Such facilities are illustratively shown as including a speaker unit 53, and are well known to those skilled in the art and need not be described here.

Thus, the second way of practicing the invention is a GO–NO GO test using the relationships shown in FIGS. 1 and 2. An operator need only observe Q on meter 52, need not perform the calculations, and need not consult the appropriate calibrate curve (FIG. 2) as in the first described way of practicing the invention.

Although a frequency of 3590 cm.$^{-1}$ has been used to describe the GO–NO GO method of practicing the invention, it is to be understood that other frequencies within the infrared frequency spectrum can be used. A frequency of 3590 cm.$^{-1}$ is suitable for predicting the acceptability of crystal wafers for fabrication into 37 EG crystal units; whereas a frequency of 3500 cm.$^{-1}$ is suitable for other codes such as 42E and 31E crystal units; and other frequencies are suitable for still other codes. The important aspect of this phase of the invention is not the particular frequency used, but that Q can be correlated to spectral absorption at a particular frequency of infrared radiation to predict the acceptability of synthetic quartz crystals for end use prior to fabrication into such end use.

Each of the illustrative ways of practicing the invention and its variations is more expedient in a given application. The first way is more expedient when testing synthetic quartz crystals which are not cut to a particular thickness. The second way, or GO–NO GO test, is more expedient when a plurality of crystal wafers are cut to a particular thickness. The GO–NO GO test would be the more practical way of practicing the method in a manufacturing application wherein large numbers of one code are produced at a time.

It is to be understood that the above described embodiments of the method of testing synthetic quartz crystals are merely illustrative of the principles of the invention, and other embodiments of the method may be devised without departing from the scope of the invention. It is also to be understood the above-described methods of testing synthetic quartz crystals and the principles involved can be applied to the testing of natural quartz crystals.

What is claimed is:

1. A method for determining the internal friction of quartz crystal by irradiating the crystal with infrared energy, comprising the steps of:

plotting a curve which correlates internal friction of quartz crystal as a function of spectral absorption with respect to first and second frequencies of infrared energy, wherein said first frequency is a base-reference frequency and the second frequency is one where quartz crystal exhibits an absorption peak characteristic, adjusting means for irradiating quartz crystal with infrared energy to establish a reference value of energy transmitted through a quartz crystal at said first frequency, irradiating a sample of quartz crystal with infrared energy at said second frequency, and measuring energy transmitted through said sample at said second frequency, and scaling off from said curve the value of internal friction for said quartz crystal sample which corresponds to the difference between said reference value and said measured value of energy.

2. A method for determining the internal friction of quartz crystal by irradiating the crystal with infrared energy, comprising the steps of:
- adjusting means for irradiating quartz crystal with infrared energy to establish a reference value of energy transmitted through quartz crystal at a first frequency,
- irradiating a sample of quartz crystal with infrared energy of a second frequency, which second frequency is one where quartz crystal exhibits an energy absorption peak characteristic,
- measuring a value of said second frequency energy transmitted through said sample, and
- from a curve which correlates for quartz crystal internal friction as a function of spectral absorption with respect to said first and second frequencies, scaling off the value of internal friction for the sample quartz crystal which corresponds to the difference between said first mentioned and second mentioned values of infrared energy.

3. A method for determining a value of internal friction to a quartz crystal by irradiating the crystal with infrared energy comprising the steps of:
- adjusting means for irradiating quartz crystal with infrared energy to establish a reference value of energy transmitted through quartz crystal,
- irradiating a sample of quartz crystal with infrared energy at a frequency at which quartz crystal indicates an energy absorption peak,
- measuring a value of energy transmitted by said sample at said frequency, and
- ascribing a value of internal friction to said sample if the measured value of transmitted energy is a given percent of the reference value of energy.

References Cited

UNITED STATES PATENTS 3,099,579  7/1963  Spitzer et al. _____ 250—83.3 X
3,109,932  11/1963  Spitzer _____ 250—83.3

ARCHIE R. BORCHELT, *Primary Examiner.*